(12) United States Patent
Glover

(10) Patent No.: US 7,622,089 B1
(45) Date of Patent: Nov. 24, 2009

(54) CONICALLY SHAPED SCREENLESS INTERNALS FOR RADIAL FLOW REACTORS

(75) Inventor: Bryan K. Glover, Algonquin, IL (US)

(73) Assignee: UOP LLC, Des Plaines, IL (US)

( * ) Notice: Subject to any disclaimer, the term of this patent is extended or adjusted under 35 U.S.C. 154(b) by 441 days.

(21) Appl. No.: 11/458,401

(22) Filed: Jul. 19, 2006

(51) Int. Cl.
*B01J 8/00* (2006.01)
*B01J 8/12* (2006.01)

(52) U.S. Cl. .................. 422/220; 422/212; 422/216; 422/219; 34/174; 34/168; 96/150; 96/152

(58) Field of Classification Search .................. None
See application file for complete search history.

(56) References Cited

U.S. PATENT DOCUMENTS

| | | | |
|---|---|---|---|
| 638,429 A * | 12/1899 | Tweedale et al. | 34/174 |
| 691,209 A * | 1/1902 | Tweedale et al. | 34/174 |
| 3,818,667 A | 6/1974 | Wagner | 52/473 |
| 5,165,900 A * | 11/1992 | Miksitz | 422/213 |
| 5,472,928 A | 12/1995 | Scheuerman et al. | 502/305 |

FOREIGN PATENT DOCUMENTS

| JP | 53146261 A2 | 12/1978 |
|---|---|---|
| JP | 02035913 A * | 2/1990 |

* cited by examiner

*Primary Examiner*—Jennifer A Leung
(74) *Attorney, Agent, or Firm*—Mark Goldberg

(57) ABSTRACT

An apparatus for contacting a bed of particulate material with a cross flowing fluid, which maintains the bed of particulate material within a retention volume. The apparatus includes partitions for retaining particles, with apertures disposed within the partitions. The apertures are covered by shrouds that extend above the edges of the apertures to prevent solid particles from spilling through inlet apertures.

5 Claims, 3 Drawing Sheets

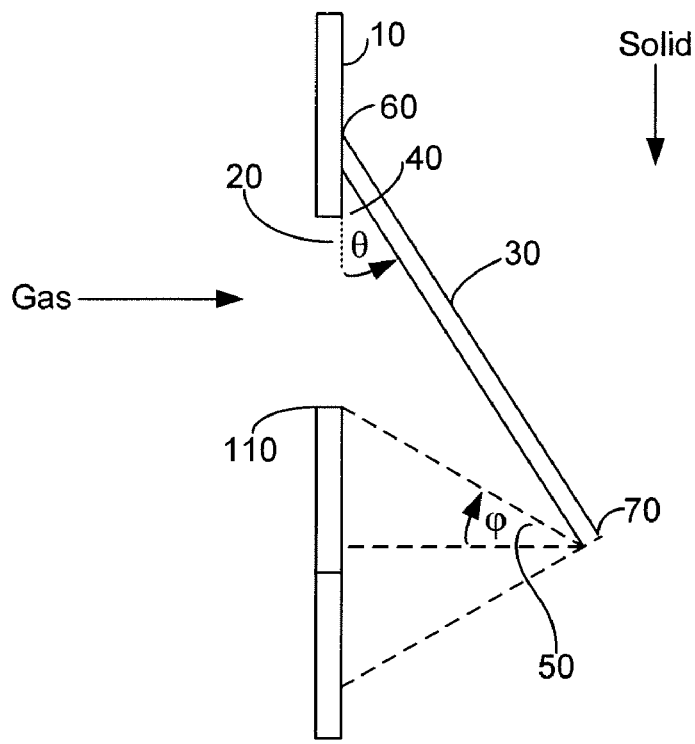
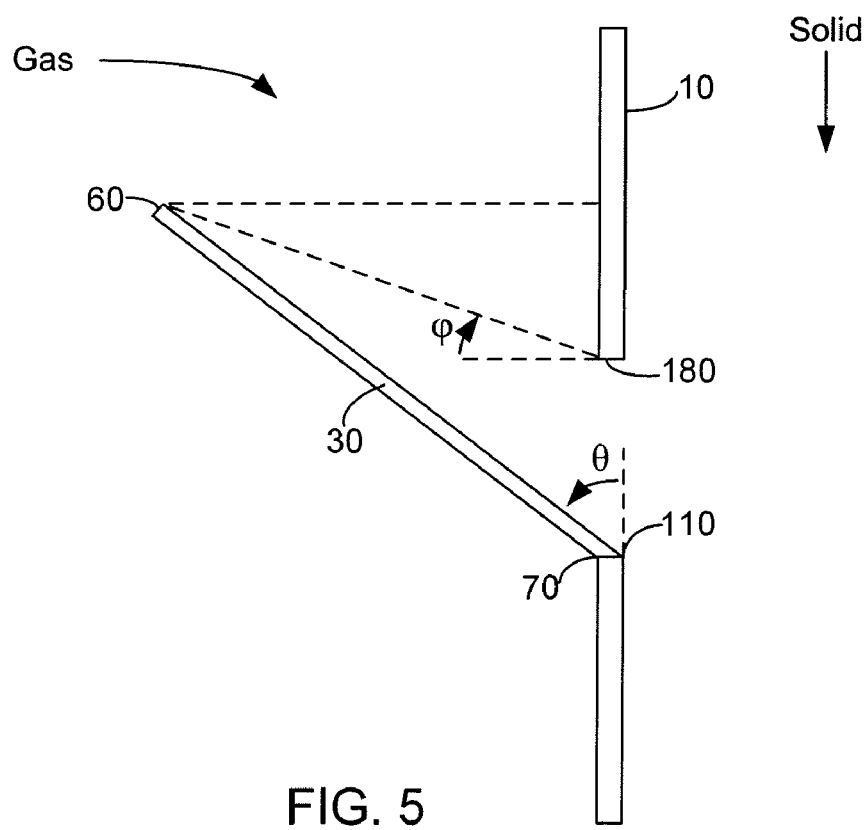
FIG. 4
FIG. 5

CONICALLY SHAPED SCREENLESS INTERNALS FOR RADIAL FLOW REACTORS

FIELD OF THE INVENTION

This invention relates to the field of fluid particle contact and to an apparatus for contacting fluids and particles. More specifically, this invention relates to a moving bed of particles with a cross-flowing fluid.

BACKGROUND OF THE INVENTION

A wide variety of processes use radial flow reactors to provide for contact between a fluid and a solid. The solid usually comprises a catalytic material on which the fluid reacts to form a product. The processes cover a range of processes, including hydrocarbon conversion, gas treatment, and adsorption for separation.

Radial flow reactors are constructed such that the reactor has an annular structure and that there are annular distribution and collection devices. The devices for distribution and collection incorporate some type of screened surface. The screened surface is for holding catalyst beds in place and for aiding in the distribution of pressure over the surface of the reactor to facilitate radial flow through the reactor bed. The screen can be a mesh, either wire or other material, or a punched plate. For a moving bed, the screen or mesh provides a barrier to prevent the loss of solid catalyst particles while allowing fluid to flow through the bed. Solid catalyst particles are added at the top, and flow through the apparatus and removed at the bottom, while passing through a screened-in enclosure that permits the flow of fluid over the catalyst. The screen is preferably constructed of a non-reactive material, but in reality the screen often undergoes some reaction through corrosion, and over time problems arise from the corroded screen or mesh.

The screens or meshes used to hold the catalyst particles within a bed are sized to have apertures sufficiently small that the particles cannot pass through. A significant problem is the corrosion of meshes or screens used to hold catalyst beds in place, or for the distribution of reactants through a reactor bed. Corrosion can plug apertures to a screen or mesh, creating dead volumes where fluid does not flow. Corrosion can also create larger apertures where the catalyst particles can then flow out of the catalyst bed with the fluid and be lost to the process increasing costs. This produces unacceptable losses of catalyst, and increases costs because of the need to add additional makeup catalyst.

The design of reactors to overcome these limitations can save significantly on downtime for repairs and on the loss of catalyst, which is a significant portion of the cost of processing hydrocarbons.

SUMMARY OF THE INVENTION

A solution to the above problem is to design a catalyst retention apparatus wherein the fluid is allowed to freely flow across the catalyst bed, while the catalyst is maintained in a catalyst retention volume. The present invention provides for a cross-flow apparatus comprising an inlet partition and an outlet partition for defining the particle retention volume, or catalyst bed. The inlet partition further has apertures defined therein, where the apertures are open holes of size sufficient for the solid catalyst to pass through. The inlet partition further includes a plurality of shrouds, wherein the shrouds cover the inlet partition apertures such that gas can flow in through the apertures and under the shrouds before passing through the catalyst bed. The shrouds are sized and positioned to prevent solid particles from flowing through the inlet apertures.

Other objects, advantages and applications of the present invention will become apparent to those skilled in the art from the following detailed description.

BRIEF DESCRIPTION OF THE DRAWINGS

FIG. 4 is a cross-section of a portion of the inlet partition and a single shroud covering an inlet aperture; and FIG. 5 is a cross-section of a portion of the inlet partition and a single blister of another embodiment.

DETAILED DESCRIPTION OF THE INVENTION

A problem exists with radial flow reactors where a catalyst flows down an annular region, and the annular region is defined by an inner screened partition and an outer screened partition, which defines the catalyst bed, or a particle retention volume for holding a granular solid. A fluid, usually a gas, flows across the partitions and catalyst bed, reacting with the catalyst to produce a product fluid, also usually a gas. The reactor holds the catalyst in with screens where the gas flows through. The partitions need holes sufficiently small to prevent catalyst particles from passing, but the holes are subject to plugging and the subsequent creation of dead spaces where the gas doesn't flow, and the waste of catalyst that is not used. The screens in the partitions are also subject to erosion and corrosion, creating holes that allow for catalyst to spill out, which is prevented by the present invention.

The apparatus can also be an adsorber for adsorbing a constituent from the fluid flowing over a granular solid adsorbent. This includes an apparatus where the adsorbent is loaded and does not flow through the adsorber, but is held in place by the inlet and outlet partitions while fluid flows over the granular adsorbent. The apparatus of the present invention is oriented for the downward, or in the direction of gravity, flow of a solid through the apparatus with the cross flow of a gas, and accordingly, the use of the terms downward and upward are in reference to directions relative to the direction of gravity.

The retrofitting of existing radial flow reactors provides for a method of improving the reactors by using a screenless inlet partition. A screenless inlet partition provides for large openings for a fluid, usually a gas, to flow through the partition. However, large openings also provide for the granular solid in an adsorber or reactor to flow out. To prevent the spillage of solid through the openings, a cover to the openings is provided on the inlet partition.

The present invention is an apparatus for supporting a granular solid in a cross-flow system, where the apparatus comprises an inlet partition, an outlet partition, and a plurality of inlet shrouds. The inlet partition has a plurality of apertures defined therein, where each aperture has a lower edge and an upper edge, the outlet partition has a plurality of apertures defined therein, where each aperture has a lower edge and an upper edge, and where the inlet and outlet partitions are spaced to define a particle retention volume for holding a granular solid. The inlet partition further includes a plurality of shrouds, where each shroud covers at least one inlet aperture to prevent the spillage of granular solid from the apparatus.

Figure 1:
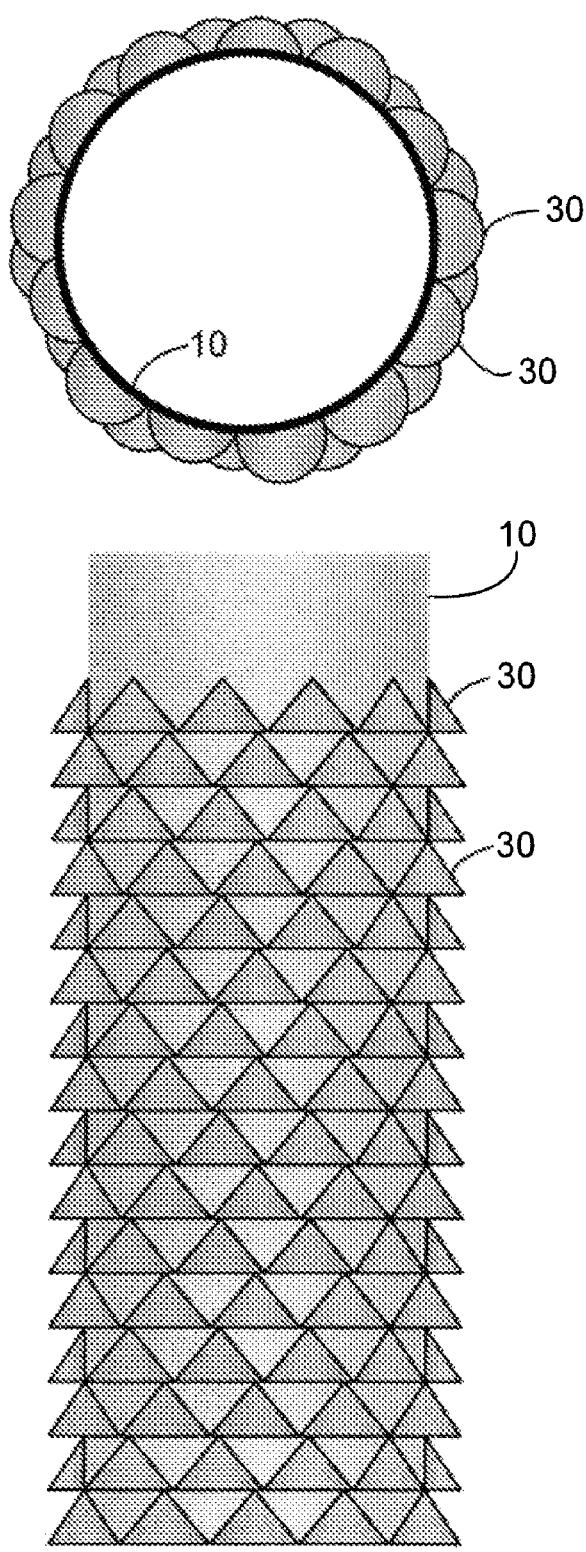
FIG. 1 is a radial reactor inlet partition with conical shrouds.
Figure 2:
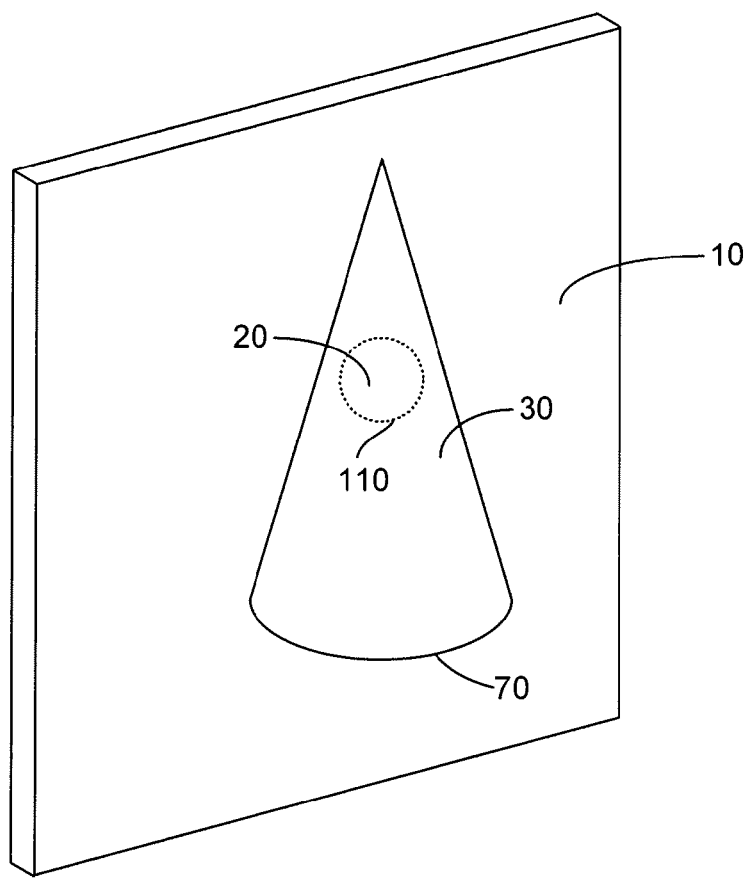
FIG. 2 is a single shroud on an inlet partition covering a single aperture.

The inlet partition of a preferred embodiment is shown in FIG. 1, where the inlet partition 10 is a cylindrical structure for a radial flow reactor. The outlet partition is a larger cylindrical structure that surrounds the inlet partition 10 and forms the particle retention volume between the inlet and outlet partitions. The inlet partition comprises a plurality of apertures that are covered by shrouds 30 having a conical shape, with the apex of the conical structure pointing upward and the open end of the shroud facing downward, and with the shroud affixed to the inlet partition 10 over an aperture, to prevent catalyst from spilling out of the inlet apertures. The conical structure for the shroud 30 is chosen as it provides a shape that allows solids to flow over the shroud and through the reactor, while preventing the solids from spilling through the inlet apertures. As shown in FIG. 2, the shroud 30 is affixed to the inlet partition 10 at a position above an aperture 20. The base of the shroud 30 is the lower edge 70 of the shroud and extends to a distance at least as low as the lower edge 110 of the aperture 20.

The shroud 30 extends away from the inlet partition at an angle between about 1 degree and about 85 degrees, with a preferred angle between about 10 degrees and about 50 degrees. The shroud 30, having a substantially conical shape, is not required to have the axis of the cone lie along the inlet partition 10, but is a section of a cone, and can have the axis of the cone extend at an angle to the inlet partition 10 to achieve a chosen steepness of the shroud, while maintaining a sufficient breadth to cover an inlet aperture 20.

Figure 3:
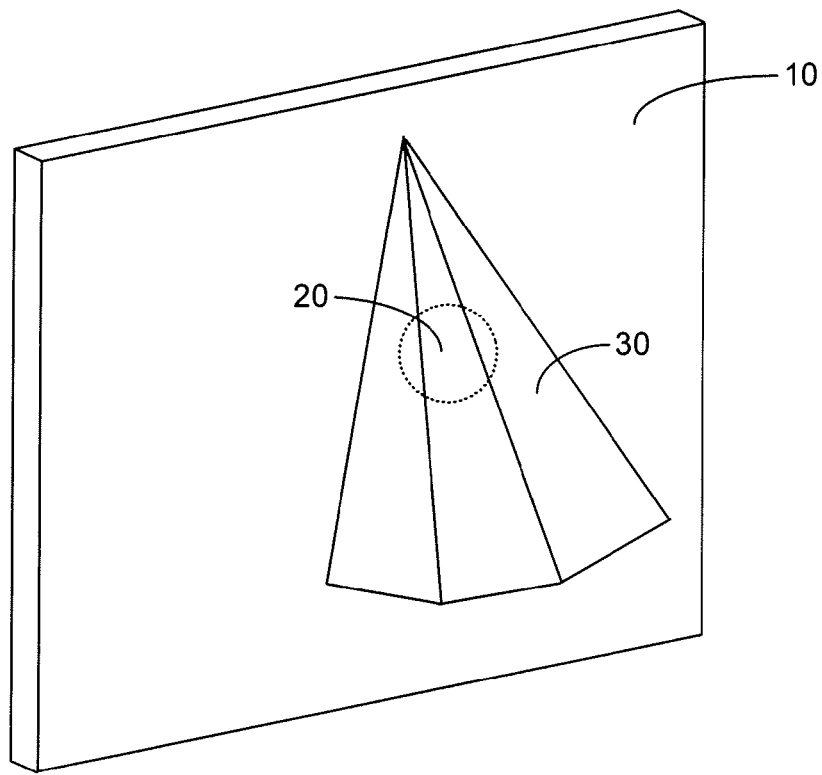
FIG. 3 is a single shroud having a pyramidal shape.

The opening angle of the cone is the vertex angle made by a cross section through the apex and center of the base of the cone. Half the opening angle for the cone is the angle, θ, that the cone extends from the inlet partition into the particle retention volume. The shroud has a height that extends from the base of the shroud to the apex of the cone shaped shroud. A cone is just a pyramid with a circular cross section. As such, pyramidal shapes are also useful for the shrouds, as shown in FIG. 3. For purposes of this invention, the shroud 30 comprises a conical, or pyramidal, section that has been cut wherein the cut extends through the annex of the shroud 30 to the base of the shroud 30. The base of the shroud 30 makes up the lower edge 70, while the edge formed from the cut through the conical section is the upper edge for this invention. With respect to the apertures 20 in the inlet position 10, the upper edge 180 refers to the edge above the midline of the aperture 20, and the lower edge 110 refers to the edge below the midline of the aperture 20.

During the filling process of the reactor, the solid fills the particle retention space, and some of the solids flow up into the void volume created between the inlet partition and the shrouds. The backfilling of this volume can create a loss of catalyst if the catalyst is allowed to flow through the inlet aperture 20. Avoiding the loss of catalyst results in significant savings as catalyst is one of the most significant costs in a petroleum refinery. The spilling of catalyst through the aperture 20 is avoided if the lower edge of the aperture is at a height above the lower edge of the shroud by a distance determined by the angle of repose, φ, of the granular catalyst. A cross-section of an inlet partition aperture 20 with a shroud 30 is shown in FIG. 4. The angle of repose, designated by the number 50, is a property of particulate solids. When bulk particles are poured onto a horizontal surface, a conical pile will form, and the angle between the edge of the pile and the horizontal surface is known as the angle of repose. The angle is related to physical properties of the material, such as particle size and shape, density, and the coefficient of friction of the particles.

Preferably, the distance, or height, of the aperture lower edge above the base, or lower edge, of the shroud is determined according to the equation, as follows:

$$d=L*\sin(\theta)*\tan(\phi),$$

where L is the length of the shroud, θ is the angle the shroud extends away from the inlet partition, and φ is the angle of repose for the granular solid. The length of the shroud, L, is the length from the apex 60 of the shroud attached to the inlet partition 10 spanning to the lower edge 70 of the shroud extending into the particle retention volume.

The angle 40, θ, is between about 10 and about 50 degrees from the vertical and preferably is between about 20 and about 35 degrees, with a more preferred angle between about 25 and about 35 degrees. The angle of the shroud is preferably chosen to provide at least the same contact area between the inlet gas and the surface of the bed of granular solid exposed under the shroud, as the surface area of a screened aperture.

The angle 40 of the shrouds 30 is chosen to minimize holdup of the granular solid as the solid flows through the apparatus. It has been found that the uppermost shrouds preferably are of a steeper angle than successive shrouds lower in the apparatus. The uppermost shrouds preferably should be oriented at an angle from vertical between about 1 degree and about 20 degrees.

In one embodiment, the shrouds are arrayed in a staggered arrangement as one progresses down the inlet partition, as shown in FIG. 1. The use of a staggered arrangement limits the amount of channeling of catalyst between the shrouds as the catalyst progresses through the reactor. For a radial reactor, the staggered arrangement can comprise having successive lower levels of shrouds positioned, from a circumferential position, between the shrouds of a higher level. The positioning does not need to be centered between two shrouds above, but can be chosen to be at any circumferential position between two shrouds above.

In another embodiment, the apparatus further comprises an outlet partition having apertures. The apertures are not covered by a screen, but are covered by shrouds in a manner similar to the inlet partition. The shrouds have a conical or pyramidal shape and are affixed to the outlet partition above the outlet apertures and extend into the particle retention volume at an angle between about 1 degree and about 85 degrees from the outlet partition. The outlet shroud lower edge extends to at least the lower edge of the outlet apertures.

During the filling process of the reactor, the solid fills the particle retention space, and some of the solids flow up into the void volume created between the outlet partition and the outlet shrouds. The backfilling of this volume can create a loss of catalyst if the catalyst is allowed to flow through the outlet apertures, as mentioned above for the inlet aperture. The spilling of catalyst through the outlet aperture is avoided if the lower edge of the outlet aperture is at a height above the lower edge of the shroud by a distance determined by the angle of repose, φ, of the granular catalyst, and is also determined according to the equation 1 above.

In another embodiment of the present invention, the apparatus comprises an inlet partition, an outlet partition, and a plurality of inlet blisters. The inlet partition has a plurality of apertures defined therein, where each aperture has a lower edge and an upper edge, the outlet partition has a plurality of apertures defined therein, where each aperture has a lower edge and an upper edge, and where the inlet and outlet partitions are spaced to define a particle retention volume for holding a granular solid. The inlet partition further includes a plurality of blisters, where each blister extends away from the inlet partition and away from the particle retention volume. Each blister has a conical or pyramidal shape with the apex pointing in a downward direction, and the open end of the blister facing upward. In a preferred embodiment, each aperture on the inlet partition will have an upper edge and a generally V-shaped lower edge, and will have a blister affixed to the lower edge, with each blister extending outward from the inlet partition at an angle between about 1 degree and about 85 degrees. Each blister has an open end with an upper edge, and the upper edge will extend to at least the upper edge of the aperture.

A cross-section of this embodiment is shown in FIG. 5. The lower edge 70 of the blister 30 is affixed to the inlet partition 10 along the lower edge 110 of the aperture. In a preferred embodiment, the upper edge 60 of the blister 30 will extend a distance above the upper edge of the aperture by a distance according to equation 1 above. And, it is preferred that the angle, θ, which the blisters extend from the inlet partition, is between about 10 degrees and about 30 degrees.

The uppermost blisters preferably are of a steeper angle than successive blisters lower on the inlet partition. The uppermost blisters preferably should be oriented at an angle from vertical between about 1 degree and about 20 degrees.

While the invention has been described with what are presently considered the preferred embodiments, it is to be understood that the invention is not limited to the disclosed embodiments, but it is intended to cover various modifications and equivalent arrangements included within the scope of the appended claims.

What is claimed is:

1. An apparatus for supporting a granular solid in a cross-flow system comprising:
   an inlet partition having apertures, wherein each aperture has a generally V-shaped lower edge and an upper edge;
   an outlet partition having apertures, wherein each aperture has a lower edge and an upper edge, and wherein the inlet partition and the outlet partition are spaced to define a particle retention volume for holding a granular solid; and
   a plurality of inlet blisters, each having an upper edge and a lower edge, each lower edge having a generally V-shape, and each inlet blister lower edge affixed to the lower edge of the inlet aperture, where the inlet blister upper edge extends to at least the upper edge of the inlet aperture and wherein the uppermost inlet blisters extend away from the particle retention volume space at an angle from vertical of about 1 degree to about 20 degrees, the remaining inlet blisters extend away from the particle retention volume space at an angle from vertical of about 10 degree to about 30 degrees and the uppermost inlet blisters extend away from the vertical at a steeper angle than the remaining inlet blisters.

2. The apparatus of claim 1 wherein the inlet blisters have an inverted conical shape.

3. The apparatus of claim 1 wherein the inlet blisters have an inverted conical shape.

4. The apparatus of claim 1 wherein the inlet blisters have an inverted pyramidal shape.

5. The apparatus of claim 1 wherein the inlet blisters are staggered at successive elevations on the inlet partition.

\* \* \* \* \*

UNITED STATES PATENT AND TRADEMARK OFFICE
CERTIFICATE OF CORRECTION

PATENT NO.       : 7,622,089 B1                                      Page 1 of 1
APPLICATION NO.  : 11/458401
DATED            : November 24, 2009
INVENTOR(S)      : Bryan K. Glover It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 569 days.

Signed and Sealed this

Twenty-sixth Day of October, 2010

David J. Kappos
*Director of the United States Patent and Trademark Office*